7481X
H. Moses.
Can for Carding Mach.
Patented Mar. 12, 1833.
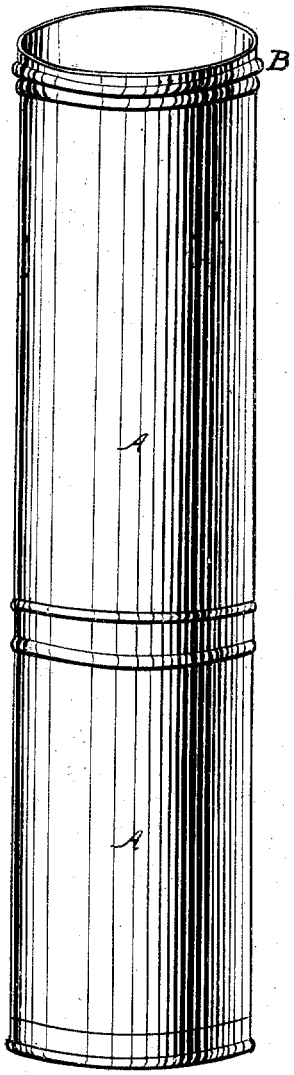
N. PETERS, PHOTO-LITHOGRAPHER, WASHINGTON, D. C.

March 12. 1833 5.

1717817 Horatio Moses Patterson New Jersey

Letters Patent

The schedule referred to in these Letters Patent and making part of the same containing a description in the words of the said Horatio Moses himself of his Improvement in the Construction of cans used in the manufacture of cotton flax and wool To all to whom these presents shall come Be it known that I Horatio Moses of Patterson in the County of [illegible] State of New Jersey have invented a new and useful Improvement in the construction of cans used in the manufacture of cotton flax and wool and that the following is a full and exact description of the construction and operation of the said improvement as invented and improved by me In the drawing accompanying this specification A is the tin or copper can. B is a hoop made of malleable iron or cast iron as may be best adapted and for which improvement the patent is claimed.

Witnesses
Thos W Whitley
Nath^l Lane

Horatio Moses [illegible]

(Dr in portfolio)

168 words